United States Patent
Fujiki

(10) Patent No.: US 10,604,150 B2
(45) Date of Patent: Mar. 31, 2020

(54) VEHICLE STOP POSITION SETTING APPARATUS AND METHOD

(71) Applicant: Nissan Motor Co., Ltd., Yokohama-shi, Kanagawa (JP)

(72) Inventor: Noriaki Fujiki, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/576,206

(22) PCT Filed: May 26, 2015

(86) PCT No.: PCT/JP2015/065062
§ 371 (c)(1),
(2) Date: Nov. 21, 2017

(87) PCT Pub. No.: WO2016/189649
PCT Pub. Date: Dec. 1, 2016

(65) Prior Publication Data
US 2018/0141547 A1    May 24, 2018

(51) Int. Cl.
*B60W 30/12* (2020.01)
*B60W 30/10* (2006.01)
(Continued)

(52) U.S. Cl.
CPC ........... *B60W 30/12* (2013.01); *B60W 30/10* (2013.01); *B60W 30/181* (2013.01); *B60W 30/18145* (2013.01); *B60W 30/18154* (2013.01); *G01C 21/26* (2013.01); *G05D 1/02* (2013.01); *G05D 1/0214* (2013.01); *G05D 1/0223* (2013.01); *G08G 1/16* (2013.01); *G08G 1/167* (2013.01);
(Continued)

(58) Field of Classification Search
None
See application file for complete search history.

(56) References Cited

U.S. PATENT DOCUMENTS 9,616,887 B2   4/2017   Takagi
2007/0106460 A1   5/2007   Nakayama et al.
(Continued)

FOREIGN PATENT DOCUMENTS

CN   1737499 A   2/2006
CN   1959347 A   5/2007
(Continued)

*Primary Examiner* — John Olszewski
*Assistant Examiner* — Gerrad A Foster
(74) *Attorney, Agent, or Firm* — Young Basile Hanlon & MacFarlane, P.C.

(57) ABSTRACT

A vehicle stop position setting apparatus is provided which includes a target route calculator (102) configured to calculate a target route for a subject vehicle and a vehicle stop position detector (101) configured to detect a vehicle stop position in a particular situation. The vehicle stop position is present on the target route calculated by the target route calculator (102). The vehicle stop position setting apparatus further includes a vehicle stop position setting unit (103) configured to, when the vehicle stop position in the particular situation is detected by the vehicle stop position detector (101), set a target vehicle stop position for the subject vehicle to be in a vehicle attitude that conforms to the particular situation.

10 Claims, 9 Drawing Sheets

(51) Int. Cl.
*G05D 1/02* (2020.01)
*G08G 1/16* (2006.01)
*G01C 21/26* (2006.01)
*B60W 30/18* (2012.01)

(52) U.S. Cl.
CPC .... *B60K 2370/175* (2019.05); *B60W 2400/00* (2013.01); *B60W 2530/00* (2013.01); *B60W 2550/10* (2013.01); *B60W 2550/146* (2013.01); *B60W 2550/22* (2013.01); *B60W 2550/30* (2013.01); *B60W 2720/10* (2013.01); *G05D 2201/0213* (2013.01)

(56) References Cited

U.S. PATENT DOCUMENTS

| | | |
|---|---|---|
| 2012/0218093 A1 | 8/2012 | Yoshizawa et al. |
| 2014/0188366 A1 | 7/2014 | Shin et al. |
| 2015/0321668 A1* | 11/2015 | Elwart ................ B60T 8/17557 701/41 |
| 2016/0229402 A1* | 8/2016 | Morita .................. B60W 30/17 |
| 2016/0272244 A1 | 9/2016 | Imai et al. |

FOREIGN PATENT DOCUMENTS

| | | |
|---|---|---|
| DE | 10028130 A1 | 12/2001 |
| JP | 2011096105 A | 5/2011 |
| JP | 2014028543 A | 2/2014 |
| JP | 2015081022 A | 4/2015 |
| KR | 20140084960 A | 7/2014 |
| WO | 2015008588 A1 | 1/2015 |

\* cited by examiner

VEHICLE STOP POSITION SETTING APPARATUS AND METHOD

TECHNICAL FIELD

The present invention relates to vehicle stop position setting apparatus and method for setting a stop position of a vehicle.

BACKGROUND

A drive assist device equipped in a vehicle is known which calculates a target route while taking into account the risk of contact between a subject vehicle and obstacles around the subject vehicle (see JP2011-96105A). In the drive assist device described in JP2011-96105A, the risk of contact between the subject vehicle and obstacles around the subject vehicle is calculated when the subject vehicle is controlled to stop at an intersection.

In the drive assist device described in JP2011-96105A, however, the attitude of the subject vehicle controlled to stop on the target route is not taken into account and the subject vehicle may possibly stop in an inappropriate attitude that does not conform to the situation on the target route.

A problem to be solved by the present invention is to provide vehicle stop position setting apparatus and method that are able to allow the subject vehicle to stop in an attitude that conforms to a situation on the target route.

SUMMARY

The present invention solves the above problem by setting a target vehicle stop position for a subject vehicle to be in a vehicle attitude that conforms to a particular situation, the target route being set in a lane, when calculating a target route for the subject vehicle, detecting a vehicle stop position in the particular situation present on the target route, and controlling the subject vehicle to stop at the vehicle stop position in the particular situation.

According to the present invention, the target vehicle stop position for the subject vehicle is set with consideration for the attitude of the subject vehicle and an effect is therefore obtained that the subject vehicle can be controlled to stop in an attitude that conforms to the situation on the target route.

DETAILED DESCRIPTION OF THE DRAWINGS

DETAILED DESCRIPTION OF THE EMBODIMENTS

Hereinafter, embodiments of the present invention will be described with reference to the drawings. The vehicle stop position setting apparatus for a vehicle according to the following embodiments relates to a vehicle travel control device that provides automated driving or drive assist for the vehicle in accordance with a target route calculated by input from a driver. In particular, this device controls a vehicle stop position for the vehicle. The automated driving or drive assist for a vehicle according to one or more embodiments of the present invention is to start the control by input from the driver and allow the vehicle to travel in accordance with the target route without the driver's accelerator operation, braking operation, and steering operation. Note, however, that if the driver performs the accelerator operation, braking operation, or steering operation, the automated driving control or drive assist control will be suspended to prioritize the driver's operation.

Figure 1:
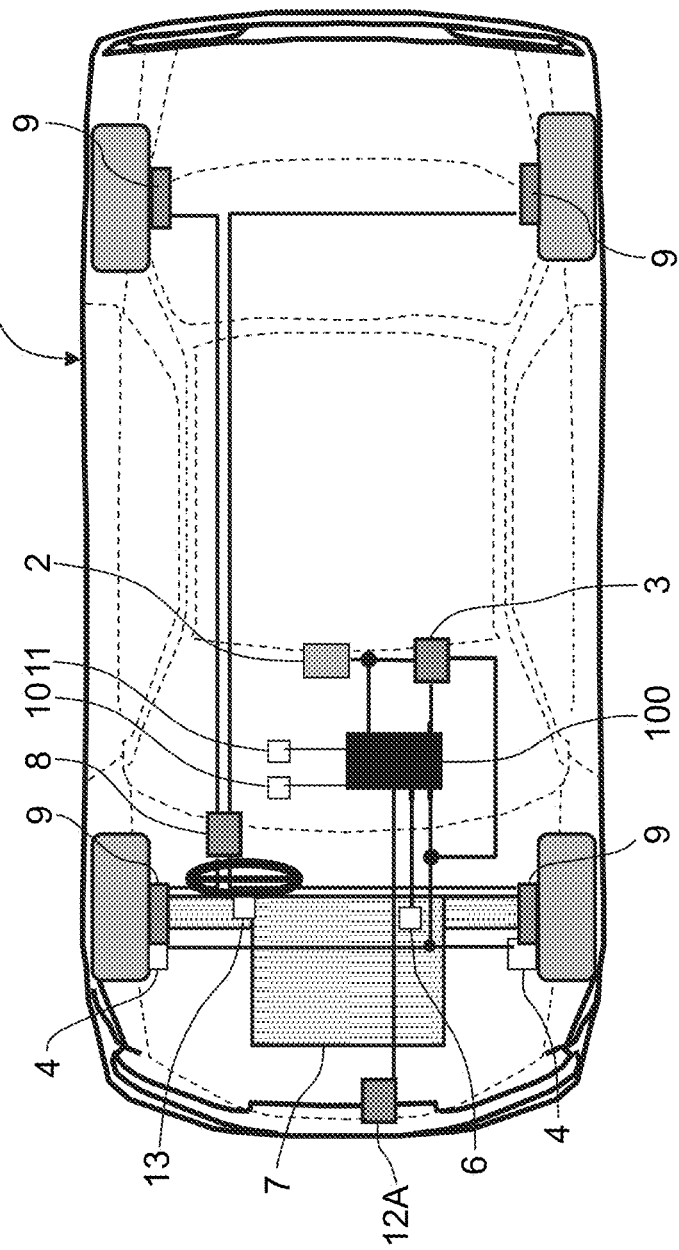
FIG. 1 is a view illustrating a hardware configuration of a vehicle to which the vehicle stop position setting apparatus and method according to a first embodiment of the present invention are applied.

《First Embodiment》 FIG. 1 is a plan view illustrating a hardware configuration of a vehicle 1 to which the vehicle stop position setting apparatus according to a first embodiment of the present invention is applied. As illustrated in the figure, the vehicle 1 comprises a global positioning system (GPS) receiver 2, a navigation unit 3, one or more vehicle speed sensors 4, a control device 100, a power train controller 6, an engine/driving system 7, a brake controller 8, one or more brake units 9, a yaw rate sensor 10, an acceleration sensor 11, a camera 12A, and a steering motor controller 13.

The GPS receiver 2 receives GPS signals related to absolute positional coordinates (latitude/longitude) of the subject vehicle and transmits the received signals to the navigation unit 3 and the control device 100. The navigation unit 3 comprises a map database 5 (see FIG. 2), an information-processing device, and a display device. The map database 5 stores information regarding shapes and slopes of roads in addition to map information. When a passenger sets a destination via the navigation unit 3, the information-processing device sets a travel route from the current position to the destination and operates the display device to display the travel route. The information-processing device transmits the travel route information to the control device 100.

The vehicle speed sensor 4 measures the vehicle speed of the subject vehicle and transmits the measurement signal to the control device 100. Available examples of the vehicle speed sensor 4 include a rotary encoder or the like attached to a wheel. The rotary encoder measures the vehicle speed on the basis of pulse signals calculated in proportion to the rotational speed of the wheel.

The control device 100, which may be an integrated circuit such as a microprocessor, comprises an A/D converter circuit, a D/A converter circuit, a central processing unit (CPU), a read only memory (ROM), a random access memory (RAM), and other necessary components. The control device 100 processes the information input from sensors, such as an accelerator pedal sensor and brake pedal sensor, using the program stored in the ROM to calculate a target vehicle speed and transmits the necessary drive force for the target vehicle speed to the power train controller 6 and the necessary braking force for the target vehicle speed to the brake controller 8. The control device 100 also processes the steering angle information, which is input from an steering angle sensor, using the program stored in the ROM to calculate a target steering angle and transmits the steering amount for the target steering angle to the steering motor controller 13.

The power train controller 6 controls the engine/driving system 7 so as to achieve the necessary driving force transmitted from the control device 100. The vehicle is exemplified to have only an engine (internal-combustion engine) as the travel drive source, but the present invention may also be applied to an electric car (including a fuel-cell car) having an electric motor as the travel drive source, a hybrid car having a combination of an engine and electric motor as the travel drive source, and other vehicles.

The brake controller 8 controls the brake unit 9, which is provided at a wheel, so as to achieve the necessary braking force transmitted from the control device 100. The steering motor controller 13 controls a steering motor (not illustrated) of a steering mechanism so as to achieve the target steering angle transmitted from the control device 100. The steering motor is a steering actuator attached to a column shaft of the steering.

The yaw rate sensor 10 measures the yaw rate of the subject vehicle and outputs the measurement signal to the control device 100. The acceleration sensor 11 measures the acceleration of the subject vehicle and transmits the measurement signal to the control device 100.

The camera 12A is, for example, an imaging device comprising an imaging element, such as a CCD. The camera 12A is disposed at the front part of the subject vehicle and captures images ahead of the subject vehicle to acquire image data. An external information recognition unit 12 (see FIG. 2), which will be described later, performs image processing on the image data acquired from the camera 12A to calculate positions of other vehicles and objects, such as curbstones, located ahead of the subject vehicle and speeds of moving objects, such as other vehicles, and outputs the calculated results to the control device 100.

Figure 2:
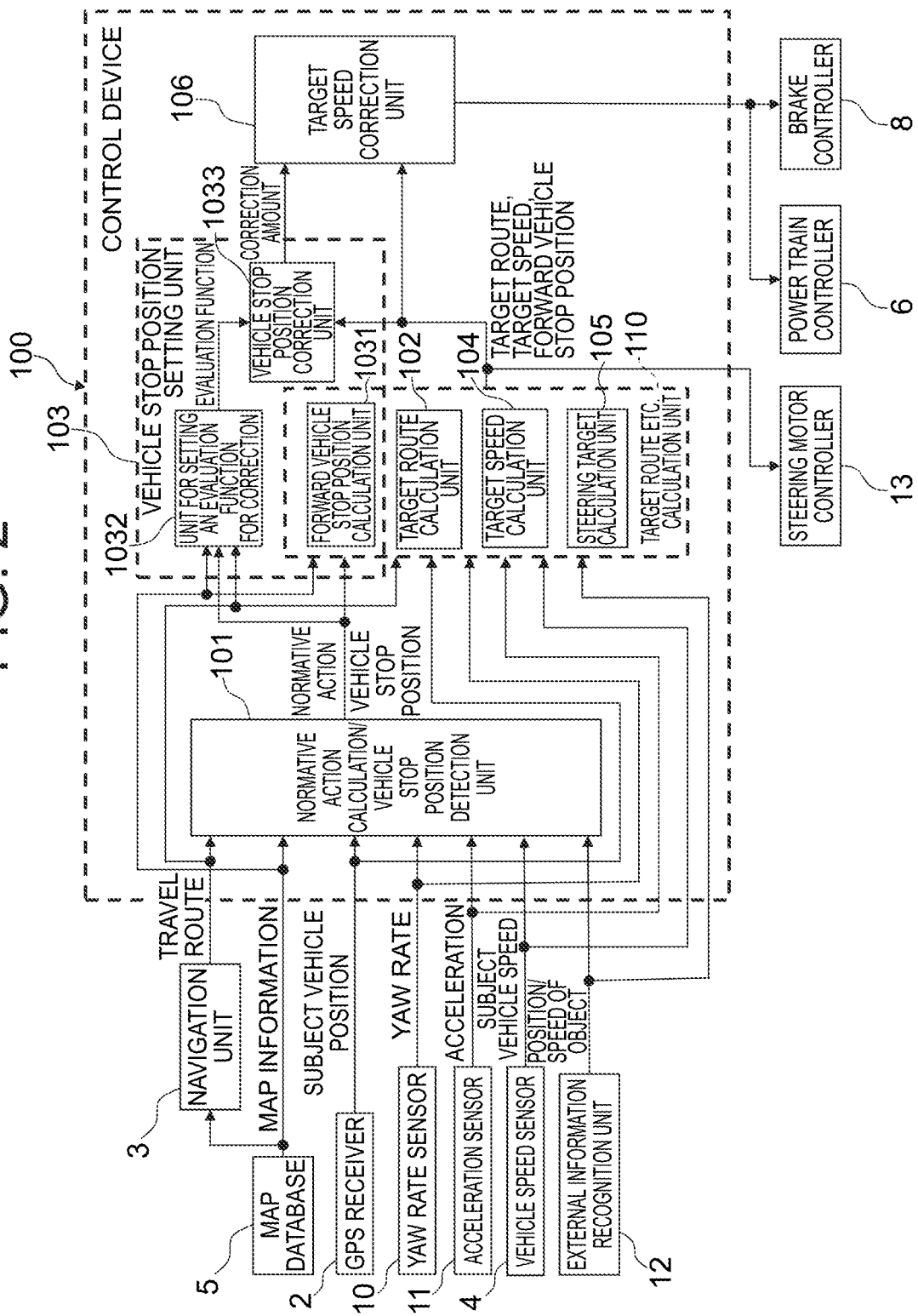
FIG. 2 is a functional block diagram of a control device of FIG. 1.

FIG. 2 is a functional block diagram of the control device 100. As illustrated in the figure, the control device 100 comprises a normative action calculation/vehicle stop position detection unit 101, a target route calculation unit 102, a vehicle stop position setting unit 103, a target speed calculation unit 104, a steering target calculation unit 105, and a target speed correction unit 106. The vehicle stop position setting unit 103 comprises a forward vehicle stop position calculation unit 1031, a unit for setting an evaluation function for correction 1032, and a vehicle stop position correction unit 1033. Here, a functional block that includes the forward vehicle stop position calculation unit 1031, the target route calculation unit 102, the target speed calculation unit 104, and the steering target calculation unit 105 is referred to as a target route etc. calculation unit 110.

The normative action calculation/vehicle stop position detection unit 101, the unit for setting an evaluation function for correction 1032, and the target route etc. calculation unit 110 receive the travel route information from the navigation unit 3 and the map information from the map database 5. The normative action calculation/vehicle stop position detection unit 101 and the target route etc. calculation unit 110 receive the absolute position information of the subject vehicle from the GPS receiver 2, the vehicle speed information of the subject vehicle from the vehicle speed sensor 4, the yaw rate information of the subject vehicle from the yaw rate sensor 10, the acceleration information of the subject vehicle from the acceleration sensor 11, and the information on the positions and speeds of objects, such as other vehicles traveling ahead of the subject vehicle, and other necessary information from the external information recognition unit 12.

The normative action calculation/vehicle stop position detection unit 101 determines whether or not to control the subject vehicle, which is traveling in accordance with the travel route set by the navigation unit 3, to stop at a certain/particular position and outputs the determination result of stopping or passing as a normative action to the target route etc. calculation unit 110 and the unit for setting an evaluation function for correction 1032. Here, examples of the certain/particular position include the following points [1] to [3]:

[1] a point, such as a stop line, at which stopping is necessary as required by the road traffic act;

[2] a point at which the subject vehicle and another vehicle may interfere with each other because the target route for the subject vehicle intersects with another lane (e.g. a vehicle stop position when the subject vehicle gets across the oncoming lane or a vehicle stop position when the subject vehicle turns to the right at an intersection); and

[3] a point, such as a pedestrian crossing, at which the subject vehicle and a pedestrian may interfere with each other.

Figure 3:
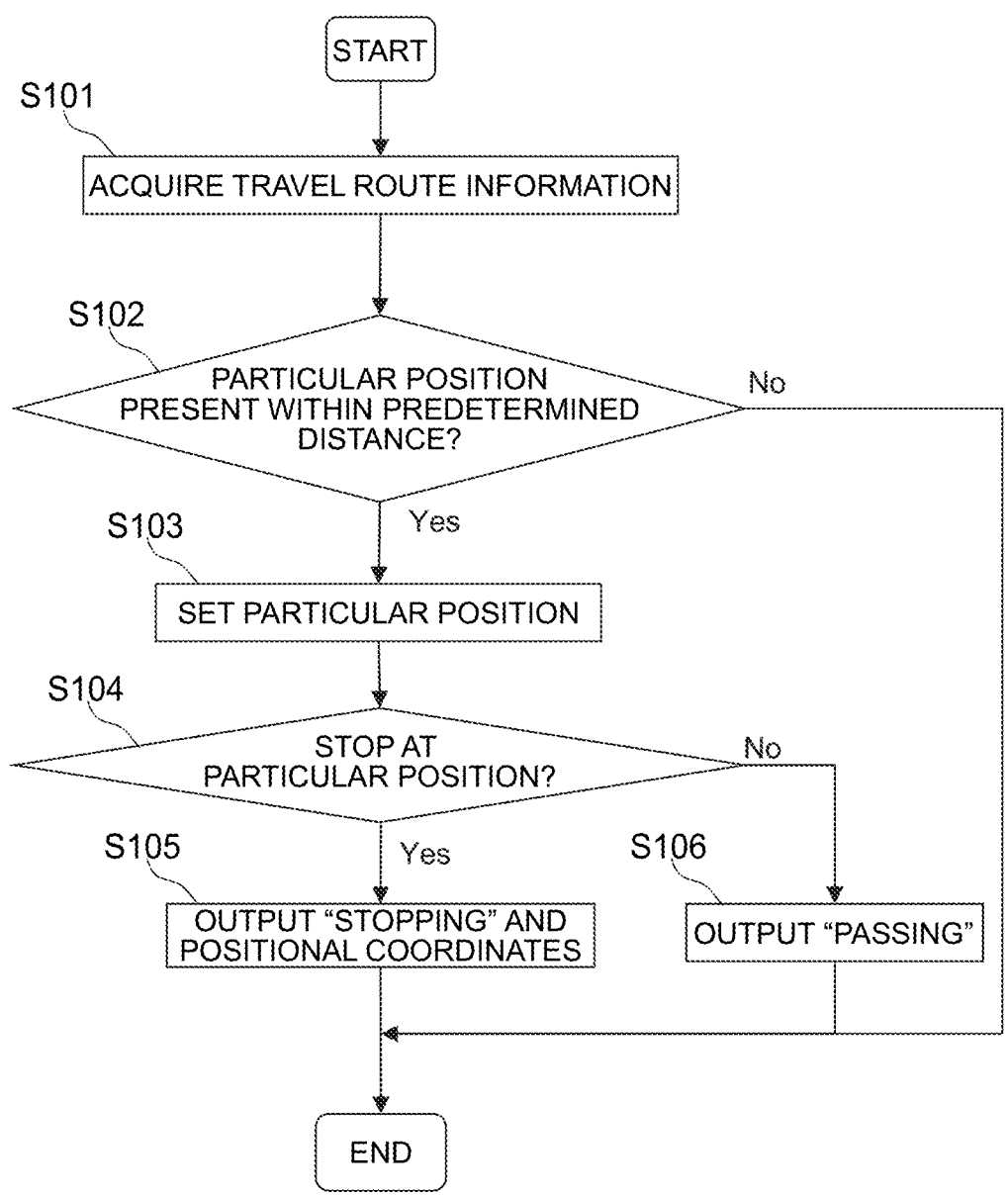
FIG. 3 is a flowchart for describing a process performed by a normative action calculation/vehicle stop position detection unit of FIG. 2.

FIG. 3 is a flowchart for describing a process performed by the normative action calculation/vehicle stop position detection unit 101. First, the normative action calculation/vehicle stop position detection unit 101 refers to the map database 5 to acquire information on the travel route from the subject vehicle to a predetermined distance (step S101). Here, the predetermined distance to be set may be a distance of about several hundred meters. In an alternative embodiment, the predetermined distance may be variable so as to be longer as the speed of the subject vehicle increases.

Then, the normative action calculation/vehicle stop position detection unit 101 determines whether or not the above certain/particular position is present within a range of the above predetermined distance from the subject vehicle, on the basis of the information acquired from the map database 5 (step S102). When an affirmative determination is made, the normative action calculation/vehicle stop position detection unit 101 sets a certain/particular position that is nearest to the subject vehicle as the above certain/particular position (step S103). When a negative determination is made, the process is ended and the travel control is executed in accordance with the set automated drive control or drive assist control.

Then, the normative action calculation/vehicle stop position detection unit 101 determines whether or not to control the subject vehicle to stop at the certain/particular position which is set in step S103 (step S104). In this step, when a stop line is present at the certain/particular position as in the case of the above point [1], the affirmative determination is always made while when no stop line is present but an interference object such as another vehicle and a pedestrian is present as in the cases of the above points [2] and [3], a determination is made as follows.

In the case of the above point [2], the normative action calculation/vehicle stop position detection unit 101 compares a time for the subject vehicle to arrive at the point at which interference may occur and a time for another vehicle to arrive at that point. For this comparison, the information input from the external information recognition unit 12 is used to obtain the position and speed of the other vehicle. When, as a result of the comparison, the difference between the arrival times is a threshold or less, the normative action calculation/vehicle stop position detection unit 101 makes an affirmative determination. Here, the threshold may be set to such a length that passengers of the subject vehicle and the other vehicle do not feel less secure.

In the case of the above point [3], the normative action calculation/vehicle stop position detection unit 101 makes an affirmative determination when the external information recognition unit 12 recognizes a pedestrian or the like who gets across the travel route for the subject vehicle.

When making an affirmative determination in step S104, the normative action calculation/vehicle stop position detection unit 101 outputs a normative action of "stopping vehicle" and coordinates on the map data of the certain/particular position set in step S103 to the target route etc. calculation unit 110 and the unit for setting an evaluation function for correction 1032 (step S105). When making a negative determination in step S104, the normative action calculation/vehicle stop position detection unit 101 outputs a normative action of "passing" to the target route etc. calculation unit 110 and the unit for setting an evaluation function for correction 1032 (step S106).

That is, the normative action calculation/vehicle stop position detection unit 101 has a function of detecting the vehicle stop position in a certain/particular situation on the target route calculated by the target route calculation unit 102 and outputting the vehicle stop position to the target route calculation unit 102 and the unit for setting an evaluation function for correction 1032.

The target route calculation unit 102 illustrated in FIG. 2 calculates a target route that passes through the travel route set by the navigation unit 3. Calculation of the target route may be carried out using a well-known method, for example, via analysis as an optimization problem. For example, an evaluation function may be set as represented by Expression (1) below.

[Mathematical Expression 1]

$$J[u(s)] = \int_0^L (w_u u(s)^2 + w_\kappa \kappa(s)^2) ds \quad (1)$$

Here, in the integrand on the right-hand side of the above Expression (1), the first term $W_u u(s)^2$ is a penalty function for a curvature change rate, u, of the route as the input and the second term $W_k k(s)^2$ is a penalty function for a curvature, k, of the route as the input. L represents a length of the route and may be set, for example, to a sufficiently long length, such as a length that allows the subject vehicle to travel for several seconds at the current speed.

The route can be obtained by solving and integrating Expression (2) that satisfies a state equation of Expression (3) and a function of Expression (4).

[Mathematical Expression 2]

$$\{u^*(s)\}_{s=0}^L = \operatorname*{argmin}_u J[u(s)] \quad (2)$$

$$\frac{dX}{ds} = f(X, u) = (\cos\theta \ \sin\theta \ \kappa \ u)^T \quad (3)$$

$$P(X(s)) > 0 \quad (4)$$

Here, X represents a state vector and is composed as $X = (x \ y \ \theta \ k)^T$ in which respective elements are coordinates (x, y) in the route, an angle $\theta$ of the traveling direction, and a curvature k. In the above Expression (4), P(X(s)) is a function that represents a distance between a boundary defined by a white line, curbstone or the like and the route. This function is set for a constraint condition that the route should not fall outside the boundary.

The steering target calculation unit 105 calculates a steering target for the subject vehicle to follow the target route calculated by the target route calculation unit 102 and outputs the steering target to the steering motor controller 13. Here, calculation of the steering target may be carried out, for example, using a well-known method, such as a method using a forward gaze model or the like. The forward gaze model refers to a model in which it is assumed that the operation amount by the driver is proportional to a forward deviation, or a deviation from the target course at a forward gaze point. When such a model is used, a target value may be calculated which enables control to converge the forward deviation to zero [m].

The target speed calculation unit 104 sets a target speed $V_r$ for the subject vehicle to travel on the target route calculated by the target route calculation unit 102. For example, the target speed $V_r$ may be set on the basis of Expression (5) below such that the lateral acceleration and yaw rate of the subject vehicle are not higher than respective thresholds at each point on the target route.

[Mathematical Expression 3]

$$V_r(s) = \min(\sqrt{R(s)a_{ymax}}, R(s)\omega_{max}) \quad (5)$$

Here, R represents a curvature radius at each point on the target route, $a_{ymax}$ represents an acceleration, and $\omega_{max}$ represents an angular speed. In an embodiment, the waveform of the target speed $V_r$ may be smoothened by using a gradient limiter, finite impulse response (FIR) filter, and/or other appropriate means for the target speed $V_r$ obtained in accordance with the above Expression (5).

The forward vehicle stop position calculation unit 1031 sets coordinates on the map data of the above certain/particular position (i.e. vehicle stop position in the certain/particular situation), which are output from the normative action calculation/vehicle stop position detection unit 101 together with "stopping" as the normative action, as the coordinates of a forward vehicle stop position. On the other hand, when "passing" is output as the normative action from the normative action calculation/vehicle stop position detection unit 101, the forward vehicle stop position calculation unit 1031 sets an invalid value for the forward vehicle stop position.

Figure 4:
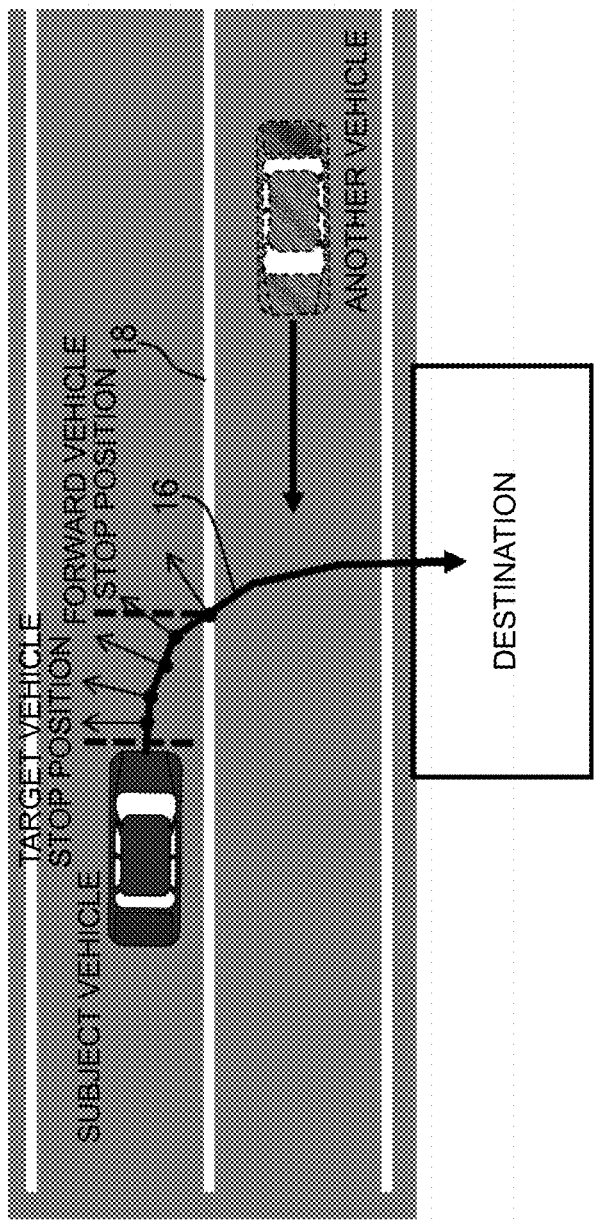
FIG. 4 is a plan view illustrating a situation in which the vehicle of FIG. 1 gets across an oncoming lane adjacent to the subject vehicle's lane to proceed to a destination.
Figure 5:
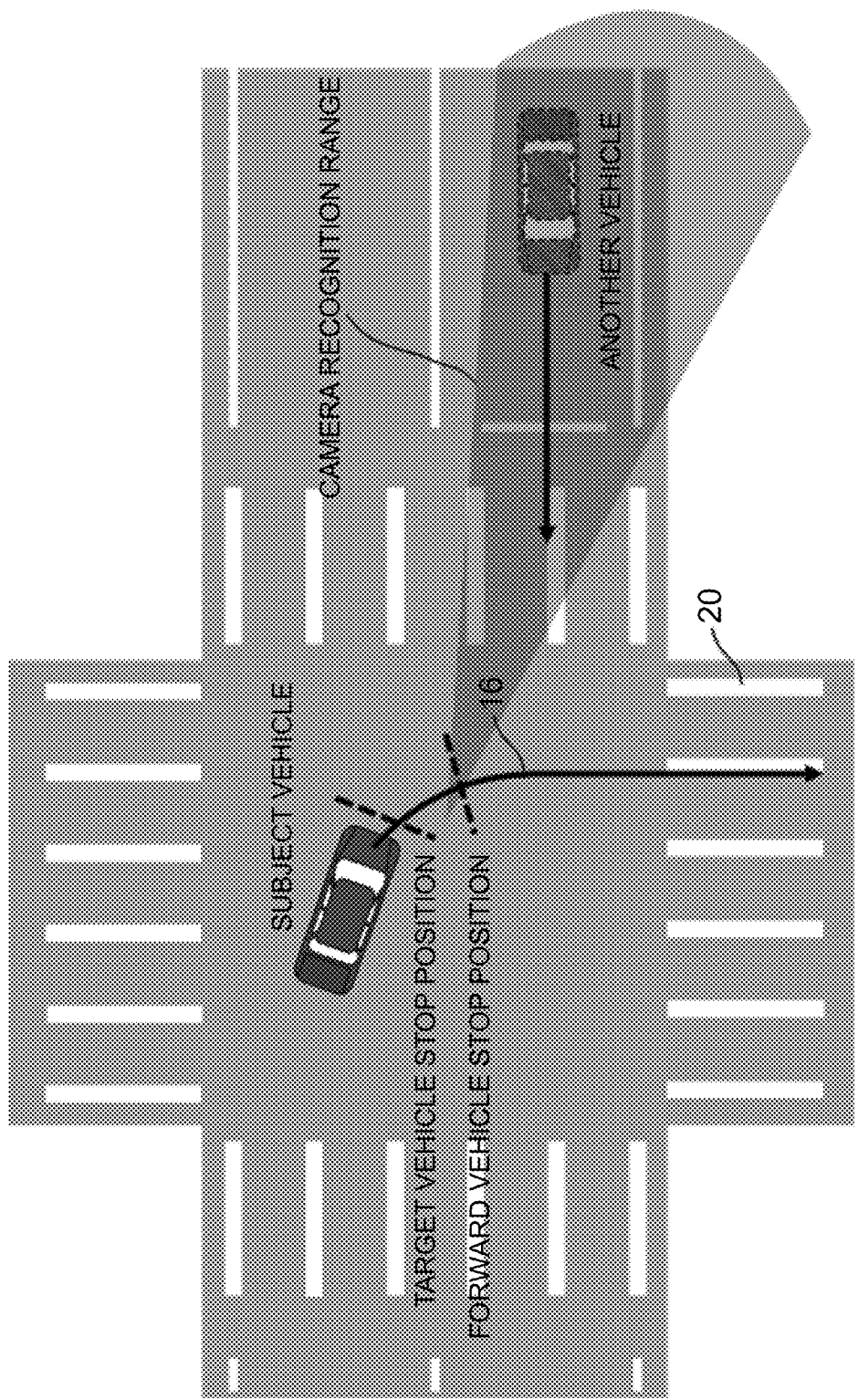
FIG. 5 is a plan view illustrating a situation in which the vehicle of FIG. 1 stops before turning to the right at an intersection.
Figure 6:
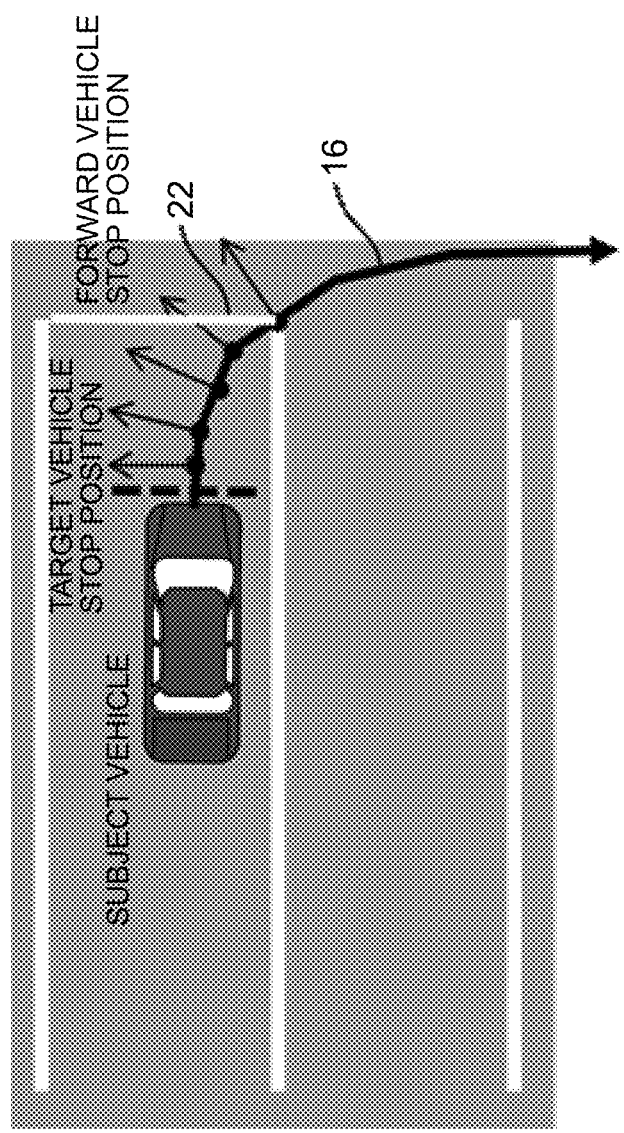
FIG. 6 is a plan view illustrating a situation in which the vehicle of FIG. 1 stops at a position where a stop line is present.

When, as illustrated in FIG. 4, the subject vehicle gets across the oncoming lane adjacent to the subject vehicle's lane to proceed to the destination, the forward vehicle stop position is set at the intersection point of a target route 16 with a boundary line 18 between the subject vehicle's lane and the oncoming lane. When the subject vehicle turns to the right at an intersection as illustrated in FIG. 5, the forward vehicle stop position is set at the rearward side in the travel direction (nearer side when viewed from the subject vehicle) than a pedestrian crossing 20 on a target route 16. When there is a stop line 22 as illustrated in FIG. 6, the forward vehicle stop position is set at a position of the stop line 22.

The unit for setting an evaluation function for correction 1032 sets an evaluation function for correcting the above forward vehicle stop position to a target vehicle stop position. The evaluation function is set in accordance with a situation of the above certain/particular position at which the subject vehicle is to stop. For example, as illustrated in FIG. 4, when the subject vehicle gets across the oncoming lane adjacent to the subject vehicle's lane to proceed to the destination, the evaluation function is set as follows.

In such a case, in order to reduce the risk of interference between the subject vehicle and another vehicle traveling in the oncoming lane, the evaluation function is set such that the subject vehicle stops in an attitude parallel to the subject vehicle' lane. For example, the evaluation function may be set as represented by Expression (6) below.

[Mathematical Expression 4]

$$f(x,y)=|\theta_T(x,y)-\theta_1(x,y)| \quad (6)$$

Here, $\theta_T(x, y)$ represents the direction of a normal vector at a point (x, y) on the target route and $\theta_1(x, y)$ represents the direction of a normal vector at a point on the boundary line 18 at which the distance from the above point (x, y) is minimum. That is, as the value of the above Expression (6) is smaller, parallelism between the subject vehicle and the boundary line 18 is higher and the evaluation value of the evaluation function is also higher. The evaluation value of the evaluation function of the present embodiment is defined to be a higher value as the vehicle attitude more conforms to the vehicle stop situation. In this case, it can be said that the vehicle attitude is more conforms to the vehicle stop situation as the parallelism between the subject vehicle and the boundary line 18 is higher. Higher parallelism therefore gives a higher evaluation value. In an alternative embodiment, the directions of normal vectors $\theta_T(x, y)$ and $\theta_1(x, y)$ may be substituted by directions of tangent vectors obtained by rotating the normal vectors by 90°.

The vehicle stop position correction unit 1033 corrects the forward vehicle stop position to a target vehicle stop position that is located rearward than the forward vehicle stop position, on the basis of the evaluation function set by the unit for setting an evaluation function for correction 1032.

Figure 7:
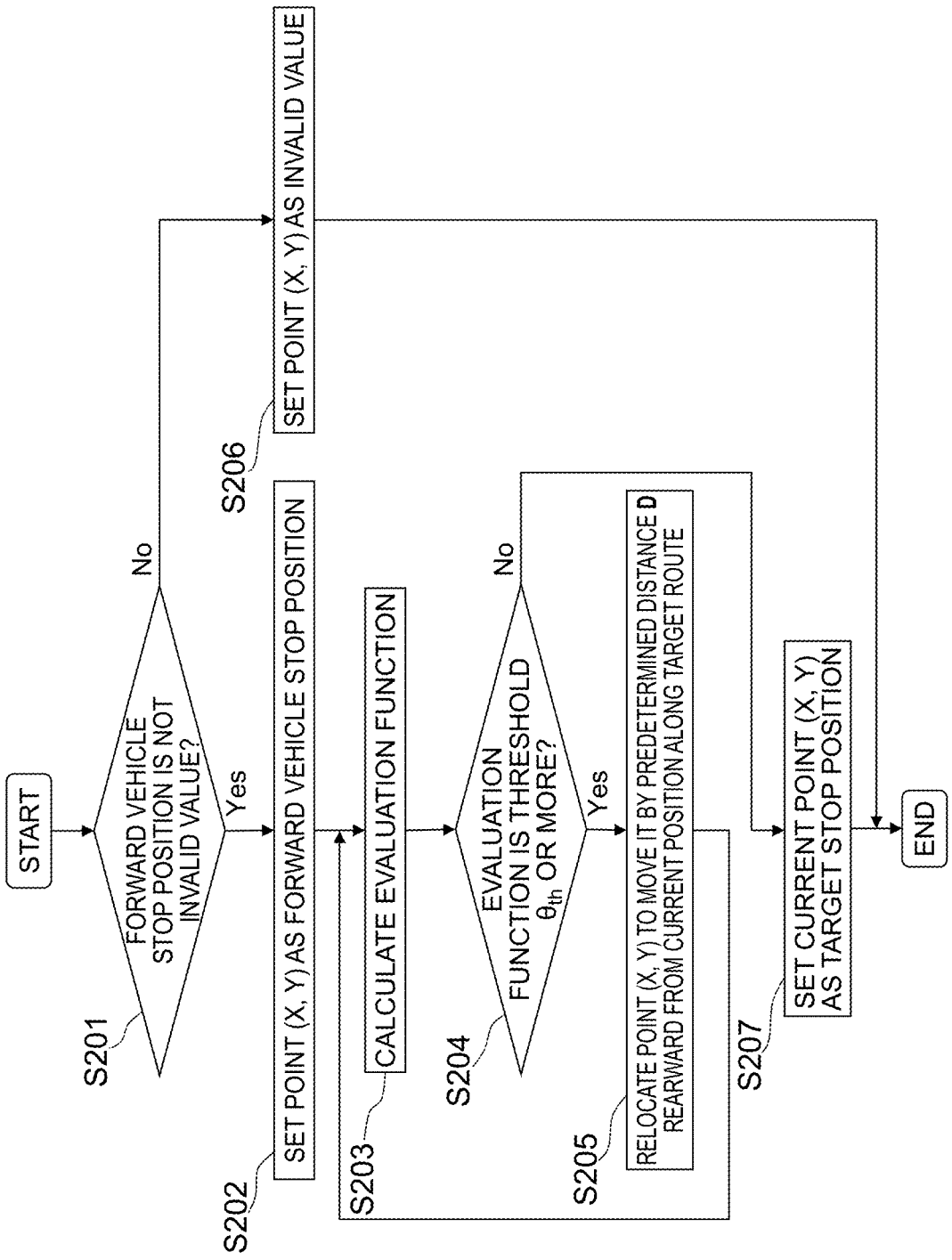
FIG. 7 is a flowchart for describing a vehicle stop position correction process executed in a vehicle stop position setting unit of FIG. 2.

FIG. 7 is a flowchart for describing a vehicle stop position correction process. First, the forward vehicle stop position calculation unit 1031 determines whether the forward vehicle stop position input from the normative action calculation/vehicle stop position detection unit 101 is an invalid value or not (step S201). In this step, a negative determination is made when "passing" is output as the normative action from the normative action calculation/vehicle stop position detection unit 101. On the other hand, an affirmative determination is made when "stopping" is output as the normative action from the normative action calculation/vehicle stop position detection unit 101 and coordinates on the map data of the above certain/particular position are set at coordinates of the forward vehicle stop position by the forward vehicle stop position calculation unit 1031.

When the affirmative determination is made in step S201, the forward vehicle stop position calculation unit 1031 sets the forward vehicle stop position as an initial value at a point (x, y) at which the subject vehicle is to stop (step S202). Then, the vehicle stop position correction unit 1033 calculates an evaluate value of the evaluation function of the above Expression (6) (step S203).

Then, the vehicle stop position correction unit 1033 determines whether or not the evaluation value calculated in step S203 is a threshold $\theta_{th}$ or higher (step S204). Then, when an affirmative determination is made in step S204, the vehicle stop position correction unit 1033 relocates the point (x, y) to move it by a predetermined distance D (e.g. 1 m) rearward from the current position along the target route (step S205). Here, the predetermined distance D may be set small as much as possible in consideration of the accuracy of the GPS receiver 2 and map data and the load of calculation processing.

The above steps S203 to S205 are repeatedly executed until a negative determination is made in step S204, that is, until the evaluation value of the above Expression (6) becomes the threshold $\theta_{th}$ or lower. Here, the threshold $\theta_{th}$ is set such that the parallelism between the normal vectors $\theta_T(x, y)$ and $\theta_1(x, y)$ is sufficiently high.

When the negative determination is made in step S204, the vehicle stop position correction unit 1033 sets the corrected point (x, y) as the target vehicle stop position (step S207). The vehicle stop position correction process is thus ended.

When the negative determination is made in step S201, that is, when the forward vehicle stop position input from the normative action calculation/vehicle stop position detection unit 101 is an invalid value (the normative action of "passing" set in step S106 of FIG. 3), the forward vehicle stop position calculation unit 1031 sets the vehicle stop position (x, y) as an invalid value (step S206). The vehicle stop position correction process is thus ended.

The target speed correction unit 106 corrects the target speed $V_r$ so that the subject vehicle can stop at the target vehicle stop position obtained through the correction by the vehicle stop position correction unit 1033. First, the target speed correction unit 106 creates a profile such that the target speed becomes zero [m/s] at the target vehicle stop position when the subject vehicle is decelerated at a certain/particular deceleration $a_g$ [m/s²]. Then, the target speed correction unit 106 compares the target speed calculated by the target speed calculation unit 104 and the target speed of the above profile to set lower one as the target speed $V_r$. This allows the corrected target speed of the subject vehicle to be zero [m/s] at the target vehicle stop position.

The target speed correction unit 106 transmits the corrected target speed to the power train controller 6 and the brake controller 8.

Description will then be directed to a vehicle stop position correction process when stopping before turning to the right at an intersection as illustrated in FIG. 5.

In such a scene, when the subject vehicle is controlled to stop in the intersection until another vehicle in the oncoming lane passes through the intersection, it is required for the external information recognition unit 12 to sufficiently recognize the information on the oncoming lane. The evaluation function is therefore set as represented by Expression (7) below such that the evaluation value is higher as a range of the oncoming lane included in a recognition range of the camera 12A is wider.

[Mathematical Expression 5]

$$f(x,y)=|S_{all}-S_o(x,y)| \quad (7)$$

Here, $S_{all}$ represents the area of a region of the oncoming lane which the camera 12A has to recognize, and is obtained by multiplication of the width of the oncoming lane and the distance of the oncoming lane required to be recognized. The distance of the oncoming lane required to be detected may be set, for example, as a distance that allows travel for several seconds at a speed limit.

$S_o(x, y)$ represents an area in which the area $S_{all}$ overlaps the recognition range of the camera 12A at a point (x, y) at which the subject vehicle is assumed to stop. The area $S_o(x, y)$ may be obtained through performing coordinate conversion of the recognition region of the camera 12A using a tangent vector at a point that has a shortest distance from the above point (x, y) on the target route and geometrically obtaining a region in which the recognition region after the coordinate conversion overlaps a recognition necessary region (area of $S_{all}$) on the map data.

The vehicle stop position correction unit 1033 corrects the forward vehicle stop position to the target vehicle stop position on the basis of the evaluation function set by the unit for setting an evaluation function for correction 1032.

Figure 8:
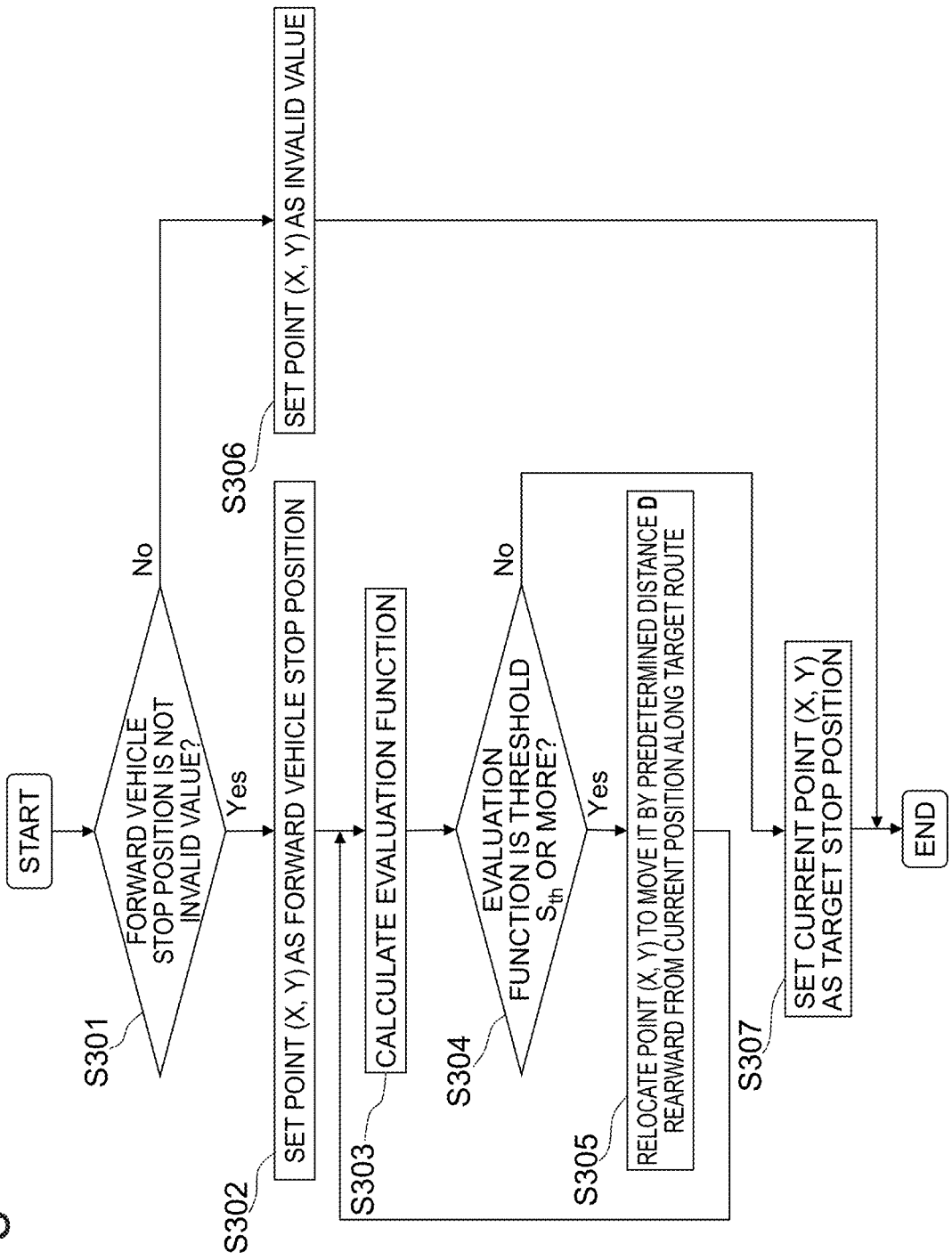
FIG. 8 is a flowchart for describing another example of a vehicle stop position correction process executed in the vehicle stop position setting unit of FIG. 2.

FIG. 8 is a flowchart for describing a vehicle stop position correction process. First, the forward vehicle stop position calculation unit 1031 determines whether the forward vehicle stop position input from the normative action calculation/vehicle stop position detection unit 101 is an invalid value or not (step S301). In this step, a negative determination is made when "passing" is output as the normative action from the normative action calculation/vehicle stop position detection unit 101. On the other hand, an affirmative determination is made when "stopping" is output as the normative action from the normative action calculation/vehicle stop position detection unit 101 and coordinates on the map data of the above certain/particular position are set at coordinates of the forward vehicle stop position by the forward vehicle stop position calculation unit 1031.

When the affirmative determination is made in step S301, the forward vehicle stop position calculation unit 1031 sets the forward vehicle stop position as an initial value at a point (x, y) at which the subject vehicle is to stop (step S302). Then, the vehicle stop position correction unit 1033 calculates an evaluate value of the evaluation function of the above Expression (7) (step S303).

Then, the vehicle stop position correction unit 1033 determines whether or not the evaluation value calculated in step S303 is a threshold $S_{th}$ or higher (step S304). When an affirmative determination is made in step S304, the vehicle stop position correction unit 1033 relocates the point (x, y) to move it by a predetermined distance D (e.g. 1 m) rearward from the current position along the target route (step S305). Here, the predetermined distance D may be set small as much as possible in consideration of the accuracy of the GPS receiver 2 and map data and the load of calculation processing.

The above steps S303 to S305 are repeatedly executed until a negative determination is made in step S304, that is, until the evaluation value of the above Expression (7) becomes the threshold $S_{th}$ or lower. Here, the threshold $S_{th}$ is set such that the area in which $S_0(x, y)$ overlaps $S_{all}$ is sufficiently wide.

When the negative determination is made in step S304, the vehicle stop position correction unit 1033 sets the corrected point (x, y) as the target vehicle stop position (step S307). The vehicle stop position correction process is thus ended.

When the negative determination is made in step S301, the forward vehicle stop position calculation unit 1031 sets the vehicle stop position (x, y) as an invalid value (step S306). The vehicle stop position correction process is thus ended.

The vehicle stop position setting apparatus of the present embodiment is configured and operates as the above and therefore has the following effects.

(1) According to the vehicle stop position setting apparatus of the present embodiment, the target route for the subject vehicle is calculated, the vehicle stop position in a particular/certain situation present on the target route is detected, and when the vehicle stop position in the certain/particular situation is detected, the target vehicle stop position is set for the subject vehicle to be in a vehicle attitude that conforms to the certain/particular situation. The subject vehicle can therefore be controlled to stop in the attitude which conforms to the situation on the target route.

(2) According to the vehicle stop position setting apparatus of the present embodiment, the target vehicle stop position is set by correcting the forward vehicle stop position, which is set ahead of the target vehicle stop position, to the rearward side on the basis of the evaluation function which evaluates the target vehicle stop position in accordance with the particular/certain situation. The subject vehicle can therefore be prevented from stopping beyond a desired vehicle stop position in the forward direction.

(3) According to the vehicle stop position setting apparatus of the present embodiment, when the subject vehicle is controlled to stop at a position at which a stop line is present, the forward vehicle stop position is set at the position of the stop line. The target vehicle stop position can thus be set behind the stop line thereby to prevent the subject vehicle from stopping beyond the stop line in the forward direction.

(4) According to the vehicle stop position setting apparatus of the present embodiment, when there is no stop line and the subject vehicle is controlled to stop in a situation in which the target route intersects with an adjacent lane to the subject vehicle's lane, the forward vehicle stop position is set at a position of a boundary between the subject vehicle's lane and the adjacent lane. The target vehicle stop position can thus be set within the subject vehicle's lane thereby to prevent the subject vehicle from stopping beyond the boundary lane into the other lane.

(5) According to the vehicle stop position setting apparatus of the present embodiment, the forward vehicle stop position is set at the rearward side than a pedestrian crossing. The forward vehicle stop position is thus set at the rearward side than the pedestrian crossing thereby to allow the subject vehicle to stop at the nearer side than the pedestrian crossing.

(6) According to the vehicle stop position setting apparatus of the present embodiment, when the target route intersects with an adjacent lane to the subject vehicle's lane, the evaluation function is set such that the evaluation value is higher as the parallelism between the subject vehicle and the lane is higher. The subject vehicle can therefore be controlled to stop at high parallelism with respect to the lane. Thus, the subject vehicle can be prevented from widely blocking the lane for stopping due to an angle of the subject vehicle in stop with respect to the lane, that is, prevented from interfering with the pathway for a vehicle traveling behind the subject vehicle.

(7) According to the vehicle stop position setting apparatus of the present embodiment, when an oncoming lane is present on the target route, the evaluation function is set such that the evaluation value is higher as a range is larger in which the oncoming lane is included in a recognition range of the camera 12A. Information on the oncoming lane can therefore be included in the recognition range of the camera 12A and it is possible to suppress suspension of the drive assist because an oncoming vehicle can be recognized.

(8) According to the vehicle stop position setting apparatus of the present embodiment, the forward vehicle stop position is corrected on the target route on the basis of a tangent vector or normal vector of the target route. The vehicle stop attitude can therefore be obtained with reference to the tangent vector or normal vector of the target route and a targeted vehicle stop attitude can thus be realized.

(9) According to the vehicle stop position setting apparatus of the present embodiment, when the target vehicle stop position is set through gradually correcting the vehicle stop position rearward, the range in which the target vehicle stop position is searched for is limitative and the calculation amount for the vehicle stop position correction can therefore be reduced.

Figure 9:
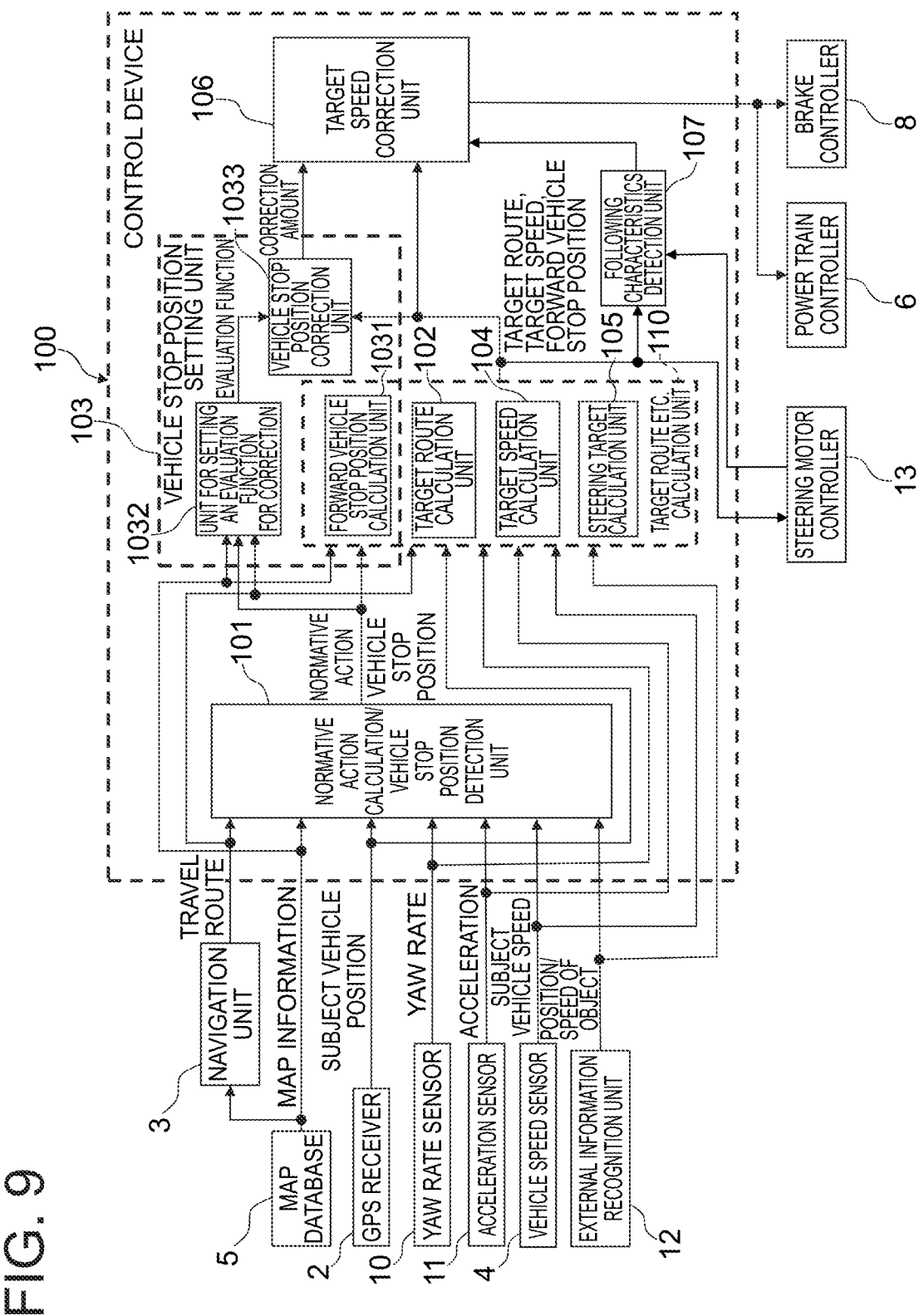
FIG. 9 is a functional block diagram of a control device according to a second embodiment of the present invention.

«Second Embodiment» FIG. 9 is a functional block diagram of a vehicle stop position setting apparatus according to a second embodiment of the present invention. The same elements as those in the first embodiment are denoted by the same reference numerals and the description thereof will be borrowed herein and omitted.

The vehicle stop position setting apparatus according to the present embodiment has a configuration in which a following characteristics detection unit 107 is added to the vehicle stop position setting apparatus according to the first embodiment. The following characteristics detection unit 107 detects an error between the current target route and the travel route for the subject vehicle when the subject vehicle stops.

The following characteristics detection unit 107 includes a memory storing a control map or control table that represents a relationship of an error between a curvature, k, of the target route and the travel route for the subject vehicle. When correction of the target vehicle stop position is executed, the following characteristics detection unit 107 outputs an error of the travel route for the subject vehicle with respect to the curvature, k, of the current target route to the vehicle stop position correction unit 1033.

When executing the calculation of the evaluation function for the vehicle stop position correction, such as the above Expression (6) or (7), the vehicle stop position correction unit 1033 adds the input error to the point (x, y). When the evaluation function uses a normal vector or tangent vector of the target route, the vehicle stop position correction unit 1033 rotates the normal vector or tangent vector in accordance with the input error.

According to the vehicle stop position setting apparatus of the present embodiment, the vehicle stop position is corrected in accordance with the following characteristics with respect to the target route. When control is executed for a vehicle such as an automated dive vehicle to follow the target route, therefore, the vehicle stop position can be corrected in accordance with the error in the control.

The above control device 100 corresponds to the vehicle stop position setting device of the present invention, the above target route calculation unit 102 corresponds to the target route calculator of the present invention, the above normative action calculation/vehicle stop position detection unit 101 corresponds to the vehicle stop position detector of the present invention, and the above vehicle stop position setting unit 103 corresponds to the vehicle stop position setting device of the present invention. The above forward vehicle stop position calculation unit 1031 corresponds to the forward vehicle stop position setting device of the present invention, the above unit for setting an evaluation function for correction 1032 corresponds to the evaluation function setting device of the present invention, and the above vehicle stop position correction unit 1033 corresponds to the correction device of the present invention.

The above external information recognition unit 12 corresponds to the external information recognition device of the present invention and the above following characteristics detection unit 107 corresponds to the following characteristics detector of the present invention.

Embodiments heretofore explained are described to facilitate understanding of the present invention and are not described to limit the present invention. It is therefore intended that the elements disclosed in the above embodiments include all design changes and equivalents to fall within the technical scope of the present invention.

DESCRIPTION OF REFERENCE NUMERALS

100 Control device
  101 Normative action calculation/vehicle stop position detection unit
  102 Target route calculation unit
  103 Vehicle stop position setting unit
    1031 Forward vehicle stop position calculation unit
    1032 Unit for setting an evaluation function for correction
    1033 Vehicle stop position correction unit
  107 Following characteristics detection unit
12 External information recognition unit

The invention claimed is:

1. A vehicle stop position setting apparatus comprising:
a control device configured to:
calculate a target route for a subject vehicle, the target route being set in a lane;
detect a vehicle stop position in a particular situation, the vehicle stop position being present on the calculated target route;
when the vehicle stop position in the particular situation is detected, set a target vehicle stop position for the subject vehicle such that a vehicle attitude of the subject vehicle conforms to the particular situation, the vehicle attitude being an attitude of the subject vehicle at the target vehicle stop position on the calculated target route;
set a forward vehicle stop position on the target route, the forward vehicle stop position being located at a frontward side in a travel direction from the target vehicle stop position on the target route;
acquire external information from a camera configured to recognize a situation around the subject vehicle;
determine an oncoming lane is present on the target route on a basis of the external information; and
based on the determination that the oncoming lane is present on the target route, correct, on the target route, the forward vehicle stop position to the target vehicle stop position such that a range of the oncoming lane included in a recognition range of the camera is a predetermined threshold or more.

2. The vehicle stop position setting apparatus of claim 1, wherein to set the target vehicle stop position for the subject vehicle comprises to:
set an evaluation function for evaluating the target vehicle stop position in the particular situation; and
correct the forward vehicle stop position to be the target vehicle stop position on a basis of the evaluation function.

3. The vehicle stop position setting apparatus according to claim 1, wherein, when a stop line is present at the vehicle stop position in the particular situation, the control device sets the forward vehicle stop position at a position of the stop line.

4. The vehicle stop position setting apparatus according to claim 1, wherein, when a stop line is not present at the vehicle stop position in the particular situation and the target route intersects with an adjacent lane to a lane in which the subject vehicle is traveling, the control device sets the forward vehicle stop position at a position of a boundary line between the lane for the subject vehicle and the adjacent lane.

5. The vehicle stop position setting apparatus according to claim 1, wherein, when a pedestrian crossing is present at the vehicle stop position in the particular situation, the control device sets the forward vehicle stop position at a rearward side in the travel direction than the pedestrian crossing.

6. The vehicle stop position setting apparatus according to claim 2, wherein, when the target route intersects, at the vehicle stop position in the particular situation, with an adjacent lane to a lane in which the subject vehicle is traveling, the control device sets the evaluation function such that an evaluation value is higher as parallelism between the subject vehicle and the lane is higher.

7. The vehicle stop position setting apparatus according to claim 2, wherein the control device is further configured to:
set the evaluation function such that, when the oncoming lane is present on the target route, an evaluation value is higher as a range is larger in which the oncoming lane is included in a recognition range of the camera.

8. The vehicle stop position setting apparatus according to claim 1, wherein the control device corrects the forward vehicle stop position on the target route on a basis of a tangent vector or a normal vector of the target route.

9. The vehicle stop position setting apparatus according to claim 1, wherein the control device is further configured to:
detect following characteristics representing a difference from an actual travel route to the target route for the subject vehicle; and
correct the forward vehicle stop position on a basis of the following characteristics.

10. A vehicle stop position setting method executed by a computer of a vehicle stop position setting apparatus equipped in a vehicle, the vehicle stop position setting method comprising:
calculating a target route for a subject vehicle, the target route being set in a lane;
detecting a vehicle stop position in a particular situation, the vehicle stop position being present on the target route; and
when the vehicle stop position in the particular situation is detected, setting a target vehicle stop position for the subject vehicle such that a vehicle attitude of the subject vehicle conforms to the particular situation, the vehicle attitude being an attitude of the subject vehicle at the target vehicle stop position on the calculated target route;
setting a forward vehicle stop position on the target route, the forward vehicle stop position being located at a frontward side in a travel direction from the target vehicle stop position on the target route;
acquiring external information from a camera configured to recognize a situation around the subject vehicle;
determining an oncoming lane is present on the target route on a basis of the external information; and
based on the determination that the oncoming lane is present on the target route, correcting, on the target route, the forward vehicle stop position to the target vehicle stop position such that a range of the oncoming lane included in a recognition range of the camera is predetermined threshold or more.

* * * * *